United States Patent
Kim et al.

(10) Patent No.: US 9,150,689 B2
(45) Date of Patent: Oct. 6, 2015

(54) METHOD OF PREPARING FLAME-RETARDANT POLYESTER FIBER AND FLAME-RETARDANT POLYESTER FIBER

(71) Applicant: KOLON INDUSTRIES, INC., Kwacheon, Kyungki-do (KR)

(72) Inventors: Yun-Jo Kim, Gumi-shi (KR); Young-Soo Lee, Cheongju-shi (KR); Si-Min Kim, Daegu (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 341 days.

(21) Appl. No.: 13/752,886

(22) Filed: Jan. 29, 2013

(65) Prior Publication Data

US 2013/0143027 A1 Jun. 6, 2013

Related U.S. Application Data

(62) Division of application No. 12/518,801, filed as application No. PCT/KR2007/006709 on Dec. 21, 2007, now Pat. No. 8,388,879.

(30) Foreign Application Priority Data

Dec. 21, 2006 (KR) ........................ 10-2006-0131626

(51) Int. Cl.
| | |
|---|---|
| *C08G 64/00* | (2006.01) |
| *C08G 63/692* | (2006.01) |
| *D01D 10/02* | (2006.01) |
| *D01F 1/07* | (2006.01) |
| *D01F 6/84* | (2006.01) |
| *C08G 79/04* | (2006.01) |
| *C08G 63/02* | (2006.01) |
| *C08K 5/5313* | (2006.01) |

(52) U.S. Cl.
CPC ............ *C08G 63/6926* (2013.01); *C08G 79/04* (2013.01); *D01D 10/02* (2013.01); *D01F 1/07* (2013.01); *D01F 6/84* (2013.01); *C08K 5/5313* (2013.01); *Y10T 428/249921* (2015.04)

(58) Field of Classification Search
USPC ........... 528/271, 272, 286, 287; 428/219, 221
See application file for complete search history.

(56) References Cited

U.S. PATENT DOCUMENTS

| | | | |
|---|---|---|---|
| 4,105,740 A | 8/1978 | Yasuda et al. | |
| 4,226,973 A | 10/1980 | Malo et al. | |
| 5,298,321 A * | 3/1994 | Isoda et al. | ................... 442/359 |
| 2001/0003618 A1 | 6/2001 | Kato et al. | |
| 2002/0132116 A1 | 9/2002 | Wandel et al. | |
| 2004/0058805 A1 | 3/2004 | Nakajima et al. | |

(Continued)

FOREIGN PATENT DOCUMENTS

| | | |
|---|---|---|
| CN | 1263122 A | 8/2000 |
| CN | 1359962 A | 7/2002 |
| CN | 1763275 A | 4/2006 |

(Continued)

*Primary Examiner* — Terressa Boykin
(74) *Attorney, Agent, or Firm* — Sughrue Mion, PLLC (57) ABSTRACT

The present invention provides a method of preparing a flame retardant polyester fiber that makes it possible to prepare a flame retardant polyester fiber having excellent shape stability while preventing a lumping phenomonon and reducing powder generation and discoloration during the preparing process of the flame retardant polyester fiber, and a flame retardant polyester fiber prepared therefrom.

5 Claims, 1 Drawing Sheet

(56) References Cited

U.S. PATENT DOCUMENTS

| | | |
|---|---|---|
| 2004/0096652 A1 | 5/2004 | Royer et al. |
| 2007/0137064 A1 | 6/2007 | Tam |

FOREIGN PATENT DOCUMENTS

| | | |
|---|---|---|
| JP | 57-212251 A | 12/1982 |
| JP | 59-191716 A | 10/1984 |
| JP | 7-166422 A | 6/1995 |
| JP | 2005-76147 A | 3/2005 |
| KR | 10-0175691 B1 | 11/1998 |
| KR | 1999-006227 B1 | 1/1999 |
| KR | 10-200-50103729 A | 11/2005 |
| KR | 10-0737977 A | 7/2007 |
| WO | 2004/011702 A1 | 2/2004 |
| WO | 2005/005512 A1 | 1/2005 |
| WO | 2006/070969 A1 | 7/2006 |

* cited by examiner

METHOD OF PREPARING FLAME-RETARDANT POLYESTER FIBER AND FLAME-RETARDANT POLYESTER FIBER

CROSS REFERENCE TO RELATED APPLICATIONS

This application is divisional of U.S. application No. 12/518,801 (issued as U.S. Pat. No. 8,388,879) filed Jun. 11, 2009, which is a National Stage of International Application No. PCT/KR2007/006709 filed Dec. 21, 2007, claiming priority based on Korean Patent Application No. 10-2006-0131626, filed Dec. 21, 2006, the contents of all of which are incorporated herein by reference in their entirety.

BACKGROUND OF THE INVENTION (a) Field of the Invention

The present invention relates to a method of preparing a flame retardant polyester fiber, and a flame retardant polyester fiber.

(b) Description of the Related Art

Polyester resins are generally available in many fields such as fibers, films, plastic moldings, and so on because of their superior mechanical strength, heat-resistance, and chemical resistance. However, the polyester resins have a disadvantage of rapid burning after being ignited, and many studies for granting flame retardancy to the resin are actively ongoing.

As a method for granting the flame retardancy to the polyester fiber, a method for coating flame retardants on the fiber surface after spinning and a method for blend-spinning of the polyester fiber wherein un-reactive flame retardants are added before spinning and after the polymerization thereof have been suggested.

As the flame retardants, compounds containing a halogen, mixtures of metal oxides, compounds containing nitrogen, compounds containing phosphorus, and the like have been utilized, and a method of drawing and heat-treating the fiber after spinning the spinning composition was used according to the general direct spinning drawing so as to promote the properties of the fiber.

However, in the case of coating the flame retardants on the fiber surface, there are some disadvantages such as incurring expense caused by the separate post-process for coating the flame retardants, the deterioration of the fiber properties caused by the mechanical abrasion during the post-process, and the deterioration of the efficacy as it is used repeatedly, because the flame retardants are merely coated on the fiber.

Furthermore, the blend spinning method of adding the non-reactive flame retardants before spinning and after polymerization thereof has some disadvantages of deterioration of the flame retardancy and the spinability of the fiber, when the non-reactive flame retardants are not uniformly mixed therein.

Furthermore, a method of making a polyester resin flame retardant by copolymerizing or blending polyester with the flame retardants during the polymerization process and preparing a polyester fiber from the resin was suggested. However, the method has a disadvantage that the properties of the fiber deteriorate according to the kinds of the flame retardants, although such method may improve the durability and the flame retardancy of the fiber in comparison with the prior method. For example, when the method uses a halogen-based flame retardant, the flame retardancy may be improved, but the polyester resin copolymerized with the flame retardant discolors and the light-resistance thereof deteriorates, and the use of flame retardant is limited because it is regarded as an environmentally harmful material. Furthermore, when the phosphorus-based flame retardant is used, there are some problems such as decreasing of thermal stability, discoloration, and deterioration of the quality of the final product.

To overcome these problems, Japan patent publication Sho 57-212251 and Sho 59-191716 suggested a method of preparing a flame retardant polyester fiber with a flame retardant polyester resin, wherein the flame retardant polyester resin is prepared by introducing a flame retardant and a polycondensation catalyst after the polycondensation is started and proceeded to some degree during the copolymerization of the polyester resin. But the method did not resolve the prior problems.

Also, when a fiber is prepared by using a general flame retardant copolymer, the drawing property and the thermal stability and so on deteriorate and it is difficult to obtain the properties required to the flame retardant polyester fiber, because the copolymer is in a heterogeneous state owing to the flame retardants copolymerized in the main chain of the resin.

Furthermore, when a flame retardant is copolymerized or blended with the polyester resin in order to obtain the flame retardancy, the maintaining time of the softening state during the solid state polymerization process becomes longer in comparison with the pure polyester resin because the melting temperature gets lower and the cold crystallization temperature gets higher than a pure polyester resin. Accordingly, there is a problem of a lumping phenomenon in which the polyester chips are coagulated in the solid state polymerization device owing to the high temperature during the solid state polymerization.

To resolve the problem, a method that slowly polymerizes the polyester while elevating the temperature stepwise from low to high during the solid state polymerization process was generally used. However, there are some problems that much powder is generated by the abrasion between the polyester chips and discoloration (dark yellowish) of the chips occurs as the time of the solid state polymerization increases, and consequently the productivity of the fiber is decreased owing to the reduction of the properties thereof.

Additionally, the flame retardant polyester fiber prepared by the prior method generally shows high thermal stress and has a disadvantage of low shape stability to heat.

SUMMARY OF THE INVENTION

Hence, the present invention provides a method of preparing a flame retardant polyester fiber that may prevent a lumping phenomenon during the preparing process of the flame retardant polyester fiber, and also reduce the powder generation and the discoloration.

Further, the present invention provides a method of preparing a flame retardant polyester fiber that enables preparation of a flame retardant polyester fiber having much better shape stability.

Such method of preparing the flame retardant polyester fiber of the present invention comprises the steps of: i) preparing flame retardant polyester chips by polymerizing a composition including a primary ester compound obtained by esterification of a dicarboxylic acid compound and a diol compound, and a phosphorous-based flame retardant represented by the following Chemical Formula 1, ii) pre-crystallizing the surface of the flame retardant polyester chips, iii) solid state polymerizing the pre-crystallized polyester chips, and iv) melting and spinning the solid state polymerized polyester chips:

[Chemical Formula 1]

wherein $R^1$ and $R^2$ are respectively or independently hydrogen, hydroxy ethyl, or hydroxy propyl, and

$R^3$ is hydrogen, a $C_1$-$C_{10}$ alkyl, or a phenyl.

According to such method of preparing the flame retardant polyester fiber, the lumping phenomenon in which the flame retardant polyester chips are coagulated during the solid state polymerization may be prevented by pre-crystallizing the flame retardant polyester chips before the solid state polymerization, and also the powder generation and the discoloration caused by abrasion between the polyester chips may be reduced by reducing the time of the solid state polymerization.

On the other hand, the method of preparing the flame retardant polyester fiber may further comprise the step of v) preparing a drawn fiber by drawing and heat-treating the undrawn fiber obtained by melting and spinning the polyester chips. Furthermore, the step v) may comprise the step of heat-treating the undrawn fiber while warper-drawing it in a drawing device that is separate from a spinning device in which melting and spinning of the polyester chips is carried out.

It is possible to draw an undrawn fiber with a high drawing ratio at a low speed and to apply a high relaxation ratio by heat-treating the undrawn fiber while warper-drawing it in the separate drawing device. Accordingly, the prepared fiber shows low thermal stress and has good shape stability to heat because it is possible to heat-treat the undrawn fiber under the high temperature for a long time.

The present invention also provides a flame retardant polyester fiber, including the unit structure represented by the following Chemical Formula 2 in the main chain thereof, wherein the orientation factor of a crystal region ($F_c$) is from 0.85 to 0.97, the orientation factor of an amorphous region ($F_a$) is from 0.15 to 0.50, the birefringence index ($\Delta n$) is from 0.1 to 0.2, and the crystallinity ($X_c$) is from 40 to 55%:

[Chemical Formula 2]

wherein $R^3$ is hydrogen, a $C_1$-$C_{10}$ alkyl, or a phenyl.

Furthermore, the present invention provides an industrial fabric including such flame retardant polyester fibers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE EMBODIMENTS

Hereinafter, referring to the attached drawings, the embodiments of the present invention will be described in more detail.

Through repeating studies for a method of preparing a flame retardant polyester fiber, the present inventors found that the coagulation of the chips during the solid state polymerization, namely a lumping phenomenon, may be restrained and the discoloration of the chips and the powder generation caused by abrasion may be decreased by carrying out the step of pre-crystallizing the surface of the polyester chips containing a phosphorus-based flame retardant before the solid state polymerization, and accomplished the present invention. Furthermore, the present inventors confirmed that the fiber prepared by drawing and heat-treating the undrawn fiber by a warper-drawing method with a separate drawing device has superior quality and shape stability to heat than the fiber prepared by the previous direct spinning drawing method.

Therefore, the method of preparing the flame retardant polyester fiber according to one embodiment of the present invention comprises the steps of: i) preparing flame retardant polyester chips by polymerizing a composition including a primary ester compound obtained by esterification of a dicarboxylic acid compound and a diol compound, and a phosphorous-based flame retardant represented by the following Chemical Formula 1, ii) pre-crystallizing the surface of the flame retardant polyester chips, iii) solid state polymerizing the pre-crystallized polyester chips, and iv) melting and spinning the solid state polymerized polyester chips:

[Chemical Formula 1]

wherein $R^1$ and $R^2$ are respectively or independently hydrogen, hydroxy ethyl, or hydroxy propyl, and $R^3$ is hydrogen, a $C_1$-$C_{10}$ alkyl, or a phenyl.

According to such method of preparing the flame retardant polyester fiber, the step i) of preparing the flame retardant polyester chips is carried out by polymerizing a composition including a primary ester compound obtained by esterification of a dicarboxylic acid compound and a diol compound, and the phosphorous-based flame retardant represented by Chemical Formula 1.

The step i) can be carried out according to the general method in the related art of the present invention, and the method is not limited.

For example, the esterification may be carried out by elevating the temperature to the range of from 200° C. to 300° C. for 1 to 12 hours under the pressure of from 0.5 to 2 atm, after introducing 30 to 80 parts by weight of a diol compound per 100 parts by weight of a dicarboxylic acid compound.

The dicarboxylic acid compound available to the esterification may be at least one selected from the group consisting of terephthalic acid and ester derivatives thereof, and the diol compound may be at least one selected from the group consisting of ethylene glycol, diethylene glycol, neopentyl glycol, 1,4-cyclohexane dimethanol, and derivatives of bisphenol-A containing ethylene glycols at both ends thereof.

After the esterification, the phosphorous-based flame retardant is introduced therein and the polymerization is carried out for 1 to 15 hours at 200° C. to 300° C.

At this time, the phosphorous-based flame retardant represented by Chemical Formula 1 may be used, and the content of the phosphorous-based flame retardant is preferably about from 3500 to 10,000 ppm based on the phosphorous atoms. Namely, the content of the phosphorous-based flame retardant is preferably 3500 ppm or more so as to exhibit the flame retardancy at the minimum, and the content is preferably 10,000 ppm or less so as to prevent the deterioration of the properties caused by excessive use of the same.

Furthermore, the composition of the step i) may further include a color-improving agent.

The color improving agent is added for preventing the discoloration caused by the low thermal stability of the phosphorous-based flame retardant during the solid state polymerization and spinning process, and a well-known material in the related art of the present invention may be used as the color improving agent and more preferably a cobalt-based compound, for example cobalt acetate [$Co(CH_3COO)_2 \cdot 4H_2O$], can be used.

The color improving agent is preferably included in an amount of from 50 to 250 ppm. Namely, the content of the color improving agent is preferably 50 ppm or more so as to exhibit the color improving effect at the minimum, and the content is preferably from 250 ppm or less so as to prevent the side-reaction caused by excessive use of the same. Furthermore, when the cobalt-based compound is used as the color improving agent, the cobalt-based compound is preferably included in an amount of from 12 to 59 ppm in the prepared fiber based on the cobalt atoms. Furthermore, it is possible to polymerize the composition in the presence of a polycondensation catalyst in the step i). As such a polycondensation catalyst, antimony trioxide, titanium trioxide, and the like, which are commonly used in the polycondensation of polyester, may be used, but the kinds of the catalysts are not limited.

The polyester resin prepared by polymerizing the composition can be made into the flame retardant polyester chips of pellet form with uniform size, after cooling them with water.

On the other hand, the step ii) of pre-crystallizing the surface of the flame retardant polyester chips is carried out after the step i).

In the method of preparing the polyester fiber according to the embodiment of the present invention, the coagulation between the flame retardant polyester chips, namely a lumping phenomenon, may be restrained by pre-crystallizing the surface of the polyester chips prepared by the step i), according to the step ii). Particularly, the lumping phenomenon can be restrained even though the solid state polymerization is carried out at a high temperature for a short time. Therefore, the present method can give a high strength property to the polyester fiber while it restrains the lumping phenomenon, and also the powder generation caused by abrasion between the flame retardant polyester chips and the discoloration (dark yellowish) of the chips may be decreased. Therefore, the properties and the productivity of the polyester fiber can be raised, according to the method of preparing the polyester fiber.

For the method of pre-crystallizing the surface of the flame retardant polyester chips, a method of rubbing the chips together may be used. For example, the method of rubbing the chips together with a rotary force of a screw by using a pre-crystallizing device having a chip inlet, a cylinder equipped with the screw therein, and a chip outlet may be used.

Herein, the crystallinity resulting from the pre-crystallization is preferably from 0.1 to 5%. That is, the crystallinity of the surface of the chips is preferably 0.1% or more in order to sufficiently exhibit the surface pre-crystallization effect, and the crystallinity of the surface of the chip is preferably 5% or less in order to prevent a decrease of workability, because when the surface crystallizes excessively, the materials having low boiling point cannot be discharged easily from the chips and thus the polymerization proceeds heterogeneously.

After carrying out the step ii), the step iii) of solid state polymerizing the surface crystallized polyester chips is carried out.

The step iii) may be carried out according to a general method in the related art of the present invention. For example, the solid state polymerization may be proceeded by introducing the polyester chips, of which the surface is pre-crystallized in the step ii), into the solid state polymerizing device, and elevating the temperature in a stepwise manner. Furthermore, with regard to the conditions of the solid state polymerization, the solid state polymerization temperature may be from 200 to 260° C., and the solid state polymerization time may be from 15 to 50 hours. Herein, the solid state polymerization time means the time from the first onset point of elevating the temperature (room temperature, the starting point of the device operation after introducing the chips) to the starting point of cooling, and the solid state polymerization temperature means the maximum temperature applied to the solid state polymerization.

The polyester that is solid state polymerized through the process may be made into chips of a pellet form having uniform size, as in the step i).

Herein, the intrinsic viscosity of the solid state polymerized polyester chips is preferably from 0.85 to 1.35. Namely, the intrinsic viscosity of the chips is preferably 0.85 or more in order to exhibit the high strength property when they are spun into fiber, and the intrinsic viscosity of the chips is preferably 1.35 or less in order to prevent the thermal degradation during spinning at the high temperature.

On the other hand, after proceeding the step iii), the step iv) of melting and spinning the solid state polymerized polyester chips is carried out so as to prepare an undrawn fiber.

In the step iv), the undrawn fiber can be made by melting and spinning the solid state polymerized polyester chips obtained by the step iii), and subsequently cooling it with quenching air by passing it through a delayed quenching zone. Herein, the spinning speed is preferably from 450 to 750 m/min based on a first godet-roller. Namely, the spinning speed is preferably 450 m/min or more in order to maintain the spinning tension at the minimum for winding, and the spinning speed is preferably 750 m/min or less in order to prevent the deterioration of the fiber properties caused by the decrease of drawability, because the orientation of the undrawn fiber is raised by the excessive spinning speed.

Furthermore, the spinning temperature is preferably from 265 to 315° C. Namely, the spinning temperature is preferably 265° C. or more in order to prevent the deterioration of the spinning properties caused by heterogeneous melt viscosity of the polyester chips, and the spinning temperature is preferably 315° C. or less in order to prevent the deterioration of the fiber properties caused by thermal degradation.

It is preferable that the delayed quenching zone has a heating hood (or an annealing heater) and a heat insulating plate. The temperature of the heating hood (or annealing heater) and the length of the heating hood or the heat insulating plate may be determined by considering the spinning tension and drawability, and preferably the temperature of the heating hood may be from 200 to 380° C., the length of the heating hood may be from 100 to 300 mm, and the length of the heat insulating plate may be from 60 to 200 mm. Furthermore, the temperature and the speed of the quenching air may be determined by considering the quenching efficiency and the uniformity of cooling, and preferably the temperature of the air may be from 15 to 30° C. and the speed of the air may be from 0.2 to 1.5 m/sec.

Furthermore, in the present method of preparing the flame retardant polyester fiber may further include the step of v) preparing a drawn fiber by drawing and heat-treating an undrawn fiber. More specifically, in the step v), it is preferable to prepare a drawn fiber by heat-treating the undrawn fiber while warper-drawing it in a drawing device that is separate from the spinning device in which melting and spinning of the polyester chips proceeds.

Namely, it is possible to produce the drawn fiber and the polyester fiber in the step v) by carrying out spinning and drawing at the same time in the drawing device connected with the spinning device, according to a conventional direct spinning drawing method (refer to FIG. 1), but it is also possible to obtain the advantages described hereinafter by producing the drawn fiber and the polyester fiber by heat-treating the undrawn fiber while warper-drawing it in the separate drawing device (refer to FIG. 2).

The conventional direct spinning drawing method executes direct heat-treating by a touch process, and thus there are some disadvantages that the application temperature is limited in the case of the polymers having low melting temperature (Tm), and the productivity is decreased because the method damages the fiber and deteriorates the quality and the strength of the fiber.

Furthermore, the direct spinning drawing method has disadvantages that the drawing ratio control and the relaxation ratio are restrictive because the method is carried out at a relatively high speed in comparison with the warper-drawing method. On the other hand, the warper-drawing method has some advantages that the high ratio drawing at low speed and the high relaxation ratio are possible and the quality and the strength of the fiber are superior, because the method uses heating air of an oven and the damage of the fiber is small. Particularly, the fiber can exhibit low thermal stress in the thermal aspect and the fiber may have superior thermal shape stability, because the heat-treating for a long time at a high temperature is possible.

Namely, the damage to the polyester fiber can be inhibited and the properties thereof can be improved by producing the drawn fiber and the polyester fiber by heat-treating the undrawn fiber while warper-drawing it in the separate drawing device (see FIG. 2), and it is possible to impart superior heat shape stability to the fiber by granting low thermal stress to the polyester fiber.

Figure 1:
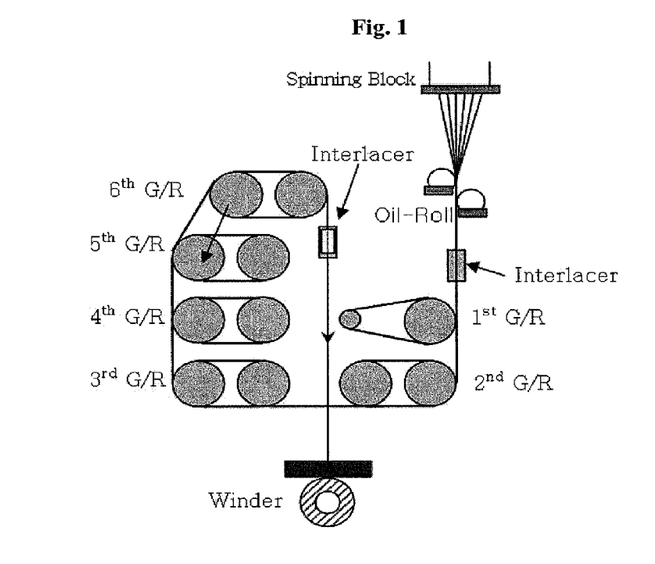
FIG. 1 is a schematic drawing showing a process of preparing a polyester fiber by a direct spinning drawing method.

On the other hand, in the case of producing the drawn fiber according to the direct spinning drawing method as shown in FIG. 1 in the step v), it is possible to draw and heat-treat the undrawn spun fiber by contacting with the high temperature godet-roller (hereinafter "G/R") continuously.

At this time, there is a limit to elevate the heat-treating temperature because the flame retardant copolymer having a low melting temperature melts and sticks easily to the G/R, and there is a disadvantage that this causes deterioration of the productivity and the quality. Furthermore, it is required to raise the relaxation ratio in order to lower the dry heat shrinkage that represents the degree of the shape stability of the fiber, but when the relaxation ratio is raised in the direct spinning drawing method, the productivity is decreased because the fiber deviates on the G/R heavily.

Figure 2:
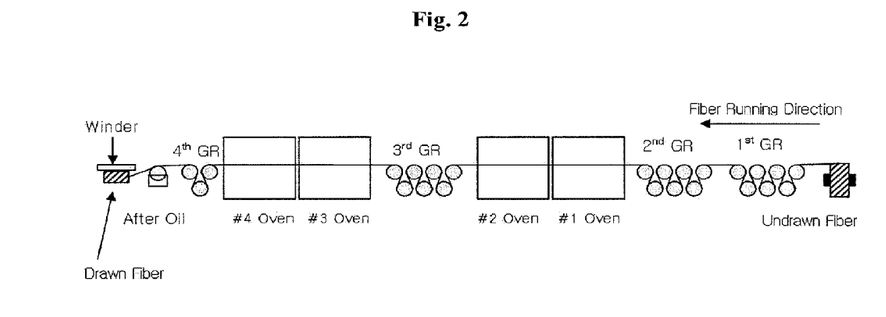
FIG. 2 is a schematic drawing showing a process of preparing a polyester fiber by a warper-drawing method according to a embodiment of the present invention.

In comparison, as shown in FIG. 2, it is possible to produce the drawn fiber by heat-treating the undrawn fiber while warper-drawing it in the separate drawing device, wherein the drawing device includes at least three groups of godet-rollers and at least two hot air ovens, and each godet-roller group preferably includes at least three godet-rollers.

Furthermore, it is preferable that the heat-treating and the warper-drawing are carried out under the conditions of the godet-roller temperature being from 90 to 150° C., the hot air oven temperature being from 210 to 275° C., the total drawing ratio being from 5.5 to 6.7, the relaxation ratio being from 5 to 20%, and the winding speed being from 150 to 300 m/min.

Namely, when the temperature of the godet-roller is below 90° C., hairiness may be formed and the drawing property may be decreased owing to the excessive drawing tension, and when the temperature is over 150° C., the polyester is crystallized and the drawing property may be deteriorated.

Furthermore, when the temperature of the hot air oven is below 210° C., the drawing property may be decreased because of the excessive drawing tension and it is difficult to lower the shrinkage ratio of the fiber because of the low heat-treating efficiency, and when the temperature is over 275° C., the fiber breaks easily because of the low melting point of the flame retardant polyester. Herein, the number of hot air ovens may be 2 or more, and the temperature of each hot air oven can be determined and combined with each other in the temperature range.

In addition, when the total drawing ratio is over 6.7 times, the hairiness is heavily formed and the quality of the fiber is decreased, and when the ratio is below 5.5 times, it is difficult to exhibit the strength.

When the relaxation ratio is below 5%, it is difficult to exhibit the low shrinkage property, and when the ratio is over 20%, it is difficult to exhibit the strength as well as to work because of the excessive fiber deviation.

Further, when the winding speed is below 150 m/min, the productivity decreases, and when the speed is over 300 m/min, it is difficult to remove a wrap, which may be formed on the godet-roller, as well as the string-up is difficult during the working process.

After proceeding the step v), the method may further include the step vi) of after-oiling the fiber so as to pick up the liquefied phosphorus-based flame retardant onto the drawn fiber, and the flame retardancy of the polyester fiber may be increased with this step.

Furthermore, according to another embodiment of the present invention, a flame retardant polyester fiber prepared by the method is provided.

This flame retardant polyester fiber comprises the unit structure represented by the following Chemical Formula 2 in the main chain thereof, wherein the orientation factor of a crystal region ($F_c$) is from 0.85 to 0.97, the orientation factor of an amorphous region ($F_a$) is from 0.15 to 0.50, the birefringence index ($\Delta n$) is from 0.1 to 0.2, and the crystallinity ($X_c$) is from 40 to 55%:

[Chemical Formula 2]

wherein $R^3$ is hydrogen, a $C_1$-$C_{10}$ alkyl, or a phenyl.

Namely, the crystallinity of the flame retardant polyester fiber is increased by the pre-crystallization during the preparing process and the fiber becomes to have the orientation factor of the crystal region ($F_c$) that is from 0.85 to 0.97, the orientation factor of the amorphous region ($F_a$) that is from 0.15 to 0.50, the birefringence index ($\Delta n$) that is from 0.1 to 0.2, and the crystallinity ($X_c$) that is from 40 to 55%. With this, the powder generation may be remarkably decreased while the lumping phenomenon is restrained during the preparing process of the flame retardant polyester fiber.

Furthermore, by controlling the orientation factor of the crystal region and the amorphous region, the birefringence index, and the crystallinity to be in the above ranges, the flame retardant polyester fiber of the present invention may have a melting temperature ($T_m$) of 235° C. or more and an intrinsic viscosity of from 0.75 to 1.05, even as it satisfies the limit oxygen index of from 27 to 37, and particularly the b value of color tone is 7.0 or less and the discoloration may be improved. Furthermore, the flame retardant polyester fiber of the present invention has superior properties such as the strength of 6.0 g/d or more and the shrinking ratio (measured by Testrite under the conditions of 190° C., 15 min, 0.01 g/d) of 8.0% or less, when the fineness of the single fiber is from 4.0 to 5.5 denier (De).

In addition, the flame retardant polyester fiber may have the thermal stress (180° C., Load=0.025-0.100g/d) of from 0.002 to 0.030 g/d. Namely, the flame retardant polyester fiber can exhibit more low thermal stress and thus it may have better shape stability to the heat, because the flame retardant polyester fiber is heat-treated at a high temperature for a long time during the preparing process, particularly the drawing process.

On the other hand, the flame retardant polyester fiber may comprise a phosphorus-based flame retardant in an amount of from 3000 to 9000 ppm based on phosphorus atoms. Namely, the content of the phosphorus-based flame retardant in the fiber may be equal to or less than the content of the phosphorus-based flame retardant in the chips, because some of the phosphorus-based flame retardant may be decomposed in the process of preparing the flame retardant polyester fiber.

According to the other embodiment of the present invention, an industrial fabric including the flame retardant polyester fiber is provided. The industrial fabric may be prepared by the general method according to kinds of the fabrics or the application field or the use thereof. However, the present industrial fabric includes the flame retardant polyester fiber having good flame retardancy and more superior properties, and thus the present fabric shows more superior properties and it can be applied to various fields. Hereinafter, preferable examples and comparative examples are presented for understanding the present invention. However, the following examples are only for illustrating the present invention and the present invention is not limited to or by them.

EXAMPLES

Example 1

Bis-(β-oxyethyl)terephthalate was prepared by the esterification reaction, wherein 50 parts by weight of ethylene glycol per 100 parts by weight of terephthalic acid was introduced into an esterification reactor, and then the reactor was heated at 240° C. for 4 hours while extracting water from the reactor by pressurizing at the pressure of 1.0 kg/cm$^2$.

4.5 parts by weight (6519 ppm based on the content of phosphorus) of 3-(hydroxyphenyl phosphinyl) propanoic acid, which is a phosphorus-based flame retardant, and 0.015 parts by weight (36 ppm based on the content of cobalt) of cobalt acetate that is a color improving agent were introduced therein, they were polymerized at 286° C. under a pressure of 755 mmHg for 4.5 hours in the presence of the antimony trioxide, which is a polycondensation catalyst, and they were made into the flame retardant polyester chips of a pellet form.

The flame retardant polyester chips were introduced into a surface crystallization device of an abrasion type, which is a device for rubbing the chips on each other by using a rotary force of a screw, and then the surface of the chips was pre-crystallized at room temperature for 1 minute.

Subsequently, the surface-crystallized polyester chips were solid state polymerized at the temperature of 230° C. for 31 hours by using a solid state polymerizing device of a vacuum dryer type, so as to produce the solid state polymerized chips having the intrinsic viscosity of 1.0 g/dl. Herein, the solid state polymerization time was estimated by the time from the first onset point of elevating the temperature (room temperature, the starting point of the device operation after introducing the chips) to the starting point of cooling, and the solid state polymerization temperature means the maximum temperature applied to the solid state polymerization.

The solid state polymerized chips were spun at a temperature of 290° C. (based on the set point of the spinning block) and passed through the delayed quenching zone composed of the heating hood (or annealing heater), of which the temperature was 300° C. and the length was 200 mm, and the heat insulating plate, of which the length was 70 mm, and then the undrawn fibers were prepared by cooling them with a quenching-air at 20° C. and the undrawn fibers were wound with a speed of 650 m/min.

The undrawn fibers were drawn in a warper-drawing device (or draw-warper) under the conditions of the drawing ratio being 5.8 times, the G/R temperature being 115° C., the hot air oven temperature being 250° C., the relaxation ratio being 15%, and the winding speed being 230 m/min, so as to produce the polyester fibers having 1000 denier, wherein the fineness of the single fiber was 5.2 DPF (denier per filament).

Examples 2-3 and Comparative Examples 1-2

As disclosed in Table 1 below, the flame retardant polyester fibers were prepared substantially according to the same method as in Example 1, except that the content of the phosphorus-based flame retardant and cobalt acetate, the pre-crystallizing of the surface of the chip, and the conditions of the solid state polymerization were varied.

TABLE 1

| Classification | Example 1 | Example 2 | Example 3 | Comparative Example 1 | Comparative Example 2 |
|---|---|---|---|---|---|
| Content of the phosphorus (P) of the flame retardant (ppm) | 6519 | 3620 | 9100 | 6519 | — |
| Content of the color improving agent (ppm) | 150 | 60 | 240 | — | — |

TABLE 1-continued

| Classification | | Example 1 | Example 2 | Example 3 | Comparative Example 1 | Comparative Example 2 |
|---|---|---|---|---|---|---|
| Pre-crystallizing of the surface of chips | | ○ | ○ | ○ | X | X |
| Conditions of the solid state polymerization | Time (h) | 31 | 27 | 40 | 185 | 20 |
| | Temperature (° C.) | 230 | 233 | 225 | 230 | 235 |
| Color tone of chips (b value) | | 2.2 | 2.0 | 4.3 | 9.0 | 0.9 |
| Amount of the powder generation (g/7 ton) | | 540 | 450 | 830 | 2670 | 270 |
| Intrinsic viscosity of the chips (g/dl) | | 1.0 | 1.2 | 0.9 | 1.3 | 1.0 |
| Spinning temperature (° C.) | | 290 | 305 | 273 | 310 | 290 |

Referring to the above Table 1, it should be noted that the powder generation of Examples 1 to 3, wherein the surface of the chips was pre-crystallized, was apparently decreased in comparison with Comparative Example 1, wherein the chips were not pre-crystallized.

Examples 4-8 and Comparative Example 3

As disclosed in Table 2 below, the flame retardant polyester fibers were prepared substantially according to the same method as in Example 1, except that the conditions of the spinning part and the drawing part were varied.

In addition, the flame retardant polyester fiber of Comparative Example 3 was prepared according to the direct spinning drawing method by using the chips of Example 1.

TABLE 2

| Classification | | Example 4 | Example 5 | Example 6 | Example 7 | Example 8 | Comparative Example 3 |
|---|---|---|---|---|---|---|---|
| Heating Hood | Temperature (° C.) | 380 | 230 | 340 | 350 | 300 | 320 |
| | Length (mm) | 300 | 300 | 200 | 300 | 300 | 200 |
| Length of the heat insulating plate (mm) | | 180 | 180 | 100 | 200 | 200 | 100 |
| Quenching-air | Temperature (° C.) | 24 | 22 | 22 | 17 | 29 | 22 |
| | Speed (m/s) | 1.0 | 0.5 | 0.5 | 0.4 | 1.4 | 0.7 |
| Spinning speed (m/min) | | 520 | 620 | 700 | 800 | 950 | 550 |
| Drawing ratio (times) | | 6.6 | 6.3 | 6.1 | 5.8 | 5.6 | 5.7 |
| G/R temperature (° C.) | | 95 | 115 | 125 | 132 | 145 | 240 |
| Temperature of the hot air oven (° C.) | | 215 | 240 | 260 | 270 | 255 | — |
| Relaxation ratio (%) | | 19.0 | 15.5 | 9.0 | 6.0 | 12.0 | 13.0 |
| Winding speed of the drawn fiber (m/min) | | 165 | 220 | 235 | 260 | 285 | 2800 |
| Fineness of the single fiber (De) | | 5.2 | 4.4 | 4.8 | 5.0 | 5.2 | 5.2 |

Experimental Examples

According to the standards below, the properties of the polyester fibers prepared by the Examples and the Comparative Examples were measured, and the results are disclosed in the below Tables 3 and 4.

1) Melting Temperature (Tm; ° C.)

The melting temperature of the fiber was measured by using a differential scanning calorimeter (DSC, Perkin-Elmer 7 series thermal analysis system), with a scanning speed of 20° C./min.

2) Birefringence Index ($\Delta n$)

The birefringence index was measured by using an interference microscope (a product by Cal Zeiss Co. German, Model Name: JENAPOLUINTERPHAKO) and calculated according to the following Calculation Formula 1:

$$\text{Birefringence Index } (\Delta n) = \frac{R+S}{1{,}000 \times D} \quad \text{[Calculation Formula 1]}$$

wherein R is a compensator retardation value (nm), S is a retardation of quartz shim (nm), and D is a fiber diameter (μm).

3) Crystallinity ($X_c$: %): Density Gradient Method

After introducing the islands in the sea fibers into a density meter (a product by Shibayama Co. Japan, Model Name: Model SS) including a mixed solvent of normal heptane and carbon tetrachloride and leaving them at 23° C. for 1 day, the bulk density (ρ) of the islands in the sea fibers in which the sea component and the island component are combined together was measured.

Based on the density, the crystallinity was calculated according to the following Calculation Formula 2 by using the theoretical densities of the perfect crystal region ($\rho_c=1.457$ g/cm$^3$) and the perfect amorphous region ($\rho_a=1.336$ g/cm$^3$) of the polyester:

$$\text{Crystallinity } [X_c \ (\%)] = \frac{\rho - \rho_a}{\rho_c - \rho_a} \times 100. \quad \text{[Calculation Formula 2]}$$

4) Orientation Factor of the Crystal ($F_c$)

The full width at half-maximum intensity (FWHM) of the peak representing the characteristics of the crystal orientation was measured by carrying out azimuthal scanning to the (010) face and the (100) face of the crystal with an X-ray diffractometer, and the orientation factor of the crystal of the island component was calculated. The following Calculation Formulae 3 and 4 were used for calculating the orientation factor of the crystal ($F_c$) from FWHM:

$$\text{Density}(\rho) = \sin^{-1}\left(\cos\frac{2\theta}{2} \times \sin\frac{FWHM}{2}\right) \quad \text{[Calculation Formula 3]}$$

$$\text{Orientation Factor of the Crystal}(F_c) = \frac{90 - \text{density}(\rho)}{90}. \quad \text{[Calculation Formula 4]}$$

5) Orientation Factor of the Amorphous ($F_a$)

The orientation factor of the amorphous ($F_a$) was calculated by substituting the crystallinity ($X_c$), the orientation factor of the crystal ($F_c$) and the birefringence index ($\Delta n$) into the following Calculation Formula 5:

$$\text{Orientation Factor of the Amorphous}(F_a) = \frac{\Delta n - X_c \times F_c \times \Delta n_c}{(1 - X_c) \times \Delta n_a} \quad \text{[Calculation Formula 5]}$$

wherein $\Delta n_c$ is an intrinsic birefringence index of the crystal (0.29), and $\Delta n_a$ is an intrinsic birefringence index of the amorphous (0.20).

6) Strength and Intermediate Elongation

The strength and the intermediate elongation were measured 10 times by using a tension tester (the length of specimen: 250 mm, the tension speed: 300 mm/min.), and the average thereof was obtained.

7) Shrinking Ratio (%)

The shrinking ratio of the fiber was measured by Testrite MK-V (a product by Testrite Co.) at the temperature of 190° C. under the tension of 0.01 g/d for 15 min.

8) Intrinsic Viscosity of the fiber

After extracting the spinning oil from the specimen with carbon tetrachloride and dissolving the specimen in ortho chlorophenol at 160±2° C., the viscosity of the specimen in a capillary was measured by using an automatic viscometer (Skyvis-4000) at the temperature of 25° C., and the intrinsic viscosity (IV) of the fiber was calculated according to the following Calculation Formula 6:

Intrinsic Viscosity (IV)=
{(0.0242×Rel)+0.2634}×F    [Calculation Formula 6]

Rel=(seconds of solution×specific gravity of solution×viscosity coefficient)/(OCP viscosity)

F=(IV of the standard chip)/(average of three IV measured from the standard chip with standard action).

9) The Fineness of the Single Fiber

The fineness of the single fiber (or denier per filament) was obtained according to the following Calculation Formula 7 by dividing the total fineness of the fibers (or total denier of the filaments) with the number of the fibers (or filaments):

Denier per Filament (DPF)=Total denier of the filaments / the number of filaments.    [Calculation Formula 7]

10) Color Tone of the Fiber (b Value)

In the case of the solid state polymerized chips, the b value was measured by using a spectrophotometer (a product by Nippon Denshoku Co., Model No.: SE-2000). In the case of the fibers, after winding the fiber on a creel with 80 cycles, the b value was measured to the two folds thereof by using computer color matching (CCM, Model No.: Datacolor SF-600).

11) Limit Oxygen Index (LOI)

After tube-knitting the fibers, the surface of the specimen was exposed to flame of a torch in an oxygen index combustibility tester (Fire Testing Technology), and whether the combustion continues and expands or not was observed with bare eyes 5 times at intervals of 5 seconds. When the specimen did not catch fire or self-extinguished a fire, the portion of oxygen in the air($V_{O2}$) was raised, and the flame retardancy test was carried out again with a new specimen set on the tester. The portion of oxygen in the air was raised and the same test was carried out until the specimen caught fire and the combustion continued and expanded. When the specimen caught fire and the combustion continued or expanded, the portion of oxygen in the total air was measured and the limited oxygen index was calculated according to the following Calculation Formula 8:

$$LOI = \frac{V_{O2}}{V_{O2} + V_{N2}} \times 100. \quad \text{[Calculation Formula 8]}$$

12) Workability (F/D)

As an index representing the productivity of the fiber, the portion of the full-cheese doffing number to the total doffing number was calculated according to the following Calculation Formula 9:

$$F/D\ (\%) = \frac{\text{Number of Full Cheese Doffing}}{\text{Number of Full Cheease Doffing} + \text{Number of Cheese Doffing}} \times 100 \quad \text{[Calculation Formula 9]}$$

13) Thermal Stress (g/d)

The thermal stress according to temperature was measured by using a thermal stress tester (Kanebo Co.) under the conditions of the first load of 0.025 g/d and 0.100 g/d with a scan speed of 2.5° C./sec, and the thermal stress at 180° C. under the first load condition was calculated according to the following Calculation Formula 10:

$$\text{Thermal stress (g/d)} = \frac{\text{Measured Thermal Stress (g, @ 180° C.)}}{\text{Fineness of the Fiber(d)} \times 2}. \quad \text{[Calculation Formula 10]}$$

14) The Number of Hairiness (ea/10⁶m)

The number of hairiness was measured by using a Fluff-Detector.

TABLE 3

| Classification | Example 1 | Example 2 | Example 3 | Comparative Example 1 | Comparative Example 2 |
|---|---|---|---|---|---|
| Melting temperature (° C.) | 241 | 247 | 236 | 238 | 255 |
| Birefringence index (Δn) | 0.146 | 0.173 | 0.137 | 0.144 | 0.196 |
| Orientation factor of the crystal ($F_c$) | 0.922 | 0.930 | 0.903 | 0.919 | 0.936 |
| Orientation factor of the amorphous ($F_a$) | 0.272 | 0.480 | 0.242 | 0.271 | 0.676 |
| Crystallinity ($X_c$) | 43.0 | 44.3 | 41.5 | 42.3 | 44.6 |
| Intrinsic viscosity of the fiber (g/dl) | 0.89 | 0.98 | 0.78 | 0.84 | 0.92 |
| Content of the phosphorus (P) (ppm) | 6450 | 3520 | 9000 | 6180 | 100 |
| Limit oxygen index (%) | 32 | 27 | 36 | 31 | 22 |
| Color tone of the fiber (b value) | 4.3 | 2.7 | 6.6 | 9.5 | 1.4 |
| Strength (g/d) | 7.0 | 7.3 | 6.6 | 6.0 | 7.6 |
| Shrinking ratio (%) | 3.0 | 2.1 | 5.8 | 3.7 | 0.6 |
| Thermal stress (@ 180° C.) @ 0.025 g/d | 0.010 | 0.002 | 0.015 | 0.011 | 0.001 |
| @ 0.100 g/d | 0.018 | 0.015 | 0.029 | 0.020 | 0.005 |
| Fineness of the single fiber (De) | 5.2 | 5.2 | 5.2 | 5.2 | 5.2 |
| Number of hairiness (ea/10⁶ m) | 1.0 | 0.7 | 1.2 | 3.5 | 0.5 |
| Workability (%) | 99.1 | 99.3 | 98.3 | 83.7 | 99.8 |

TABLE 4

| Classification | Example 4 | Example 5 | Example 6 | Example 7 | Example 8 | Comparative Example 3 |
|---|---|---|---|---|---|---|
| Melting temperature (° C.) | 239 | 244 | 243 | 242 | 241 | 236 |
| Birefringence index (Δn) | 0.158 | 0.148 | 0.178 | 0.188 | 0.133 | 0.141 |
| Orientation factor of the crystal ($F_c$) | 0.943 | 0.928 | 0.920 | 0.931 | 0.889 | 0.909 |
| Orientation factor of the amorphous ($F_a$) | 0.384 | 0.287 | 0.467 | 0.474 | 0.173 | 0.229 |
| Crystallinity ($X_c$) | 41.3 | 42.8 | 48.8 | 53.2 | 44.1 | 43.7 |
| Intrinsic viscosity of the fiber (g/dl) | 0.87 | 0.89 | 0.90 | 0.91 | 0.91 | 0.85 |
| Content of the phosphorus (P) (ppm) | 6390 | 6430 | 6450 | 6460 | 6470 | 6150 |
| Limit oxygen index (%) | 31 | 32 | 32 | 32 | 32 | 30 |
| Color tone of the fiber (b value) | 6.5 | 6.0 | 5.3 | 4.9 | 4.2 | 9.6 |
| Strength (g/d) | 6.7 | 7.5 | 7.8 | 7.8 | 7.0 | 5.1 |
| Shrinking ratio (%) | 5.7 | 4.5 | 5.5 | 5.8 | 3.3 | 4.7 |
| Thermal stress (@ 180° C.) @ 0.025 g/d | 0.015 | 0.014 | 0.017 | 0.016 | 0.013 | 0.021 |
| @ 0.100 g/d | 0.029 | 0.025 | 0.028 | 0.030 | 0.022 | 0.039 |
| Fineness of the single fiber (De) | 5.2 | 4.4 | 4.8 | 5.0 | 5.2 | 5.2 |
| Number of hairiness (ea/10⁶ m) | 1.8 | 1.6 | 0.8 | 2.0 | 1.2 | 5.8 |
| Workability (%) | 96.5 | 98.4 | 97.7 | 98.3 | 96.1 | 67.5 |

As shown Tables 3 and 4, it is identified that Examples 1 to 8, in which the surface of the polyester chips was pre-crystallized, show better flame retardancy in comparison with Comparative Examples 1 to 2 (particularly, Comparative Example 2), in which the pre-crystallization was not applied, and also the workability thereof is good and the properties of the fiber such as strength and the like is uniformly maintained as good (particularly, in comparison with Comparative Example 1; at least one of the workability and the several properties thereof may be equivalent or better and they exhibit remarkably superior flame retardancy in comparison with Comparative Example 2), because the lumping phenomonon, the powder generation, and the discoloration are prevented during the preparing process.

Furthermore, in comparison with Comparative Example 3, in which a direct spinning drawing was applied and the pre-crystallization step was not carried out as in Comparative Example 1, it can be known that the workability, the quality, and the shape stability of the fiber of Examples 1 to 8 are excellent.

Although the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A flame retardant polyester fiber, comprising the unit structure represented by the following Chemical Formula 2 in the main chain thereof, wherein an orientation factor of a crystal region is from 0.85 to 0.97, an orientation factor of an amorphous region is from 0.15 to 0.50, a birefringence index is from 0.1 to 0.2, a crystallinity is from 40 to 55%, a limited oxygen index is from 27 to 37, a melting temperature is 235° C. or more, an intrinsic viscosity is from 0.75 to 1.05, a b value of the color tone is 7.0 or less, a strength is 6.0 g/d or more, a shrinking ratio, which is measured by Testrite under the conditions of 190° C., 15 min, 0.01 g/d, is 8.0% or less, and a fineness of the fiber is from 4.0 to 5.5 denier,

[Chemical Formula 2]

wherein $R^3$ is hydrogen, a $C_1$-$C_{10}$ alkyl, or a phenyl.

2. The flame retardant polyester fiber according to claim 1, which has a thermal stress, measured at 180° C, under a load of 0.025-0.100 g/d, of 0.002 to 0.030 g/d.

3. The flame retardant polyester fiber according to claim 1, comprising a phosphorus-based flame retardant in an amount of from 3000 to 9000 ppm based on phosphorus atoms.

4. An industrial fabric, including the flame retardant polyester fiber of claim 1.

5. The flame retardant polyester fiber according to claim 1, which is produced from a polyester chip, said polyester chip comprising the unit structure of the Chemical Formula 2 in the main chain thereof and has crystallinity of 0.1-5%.

* * * * *